May 5, 1964 E. B. ROMBERG 3,131,564
VELOCITY METER WITH DIGITAL READOUT
Filed Dec. 30, 1960 6 Sheets-Sheet 1

INVENTOR.
EDGAR B. ROMBERG
BY
Ernest L. Brown
ATTORNEY

INVENTOR.
EDGAR B. ROMBERG
BY
Ernest L. Brown
ATTORNEY

INVENTOR.
EDGAR B. ROMBERG

May 5, 1964          E. B. ROMBERG          3,131,564

VELOCITY METER WITH DIGITAL READOUT

Filed Dec. 30, 1960          6 Sheets-Sheet 4

INVENTOR.
EDGAR B. ROMBERG

BY Ernest L. Brown

ATTORNEY

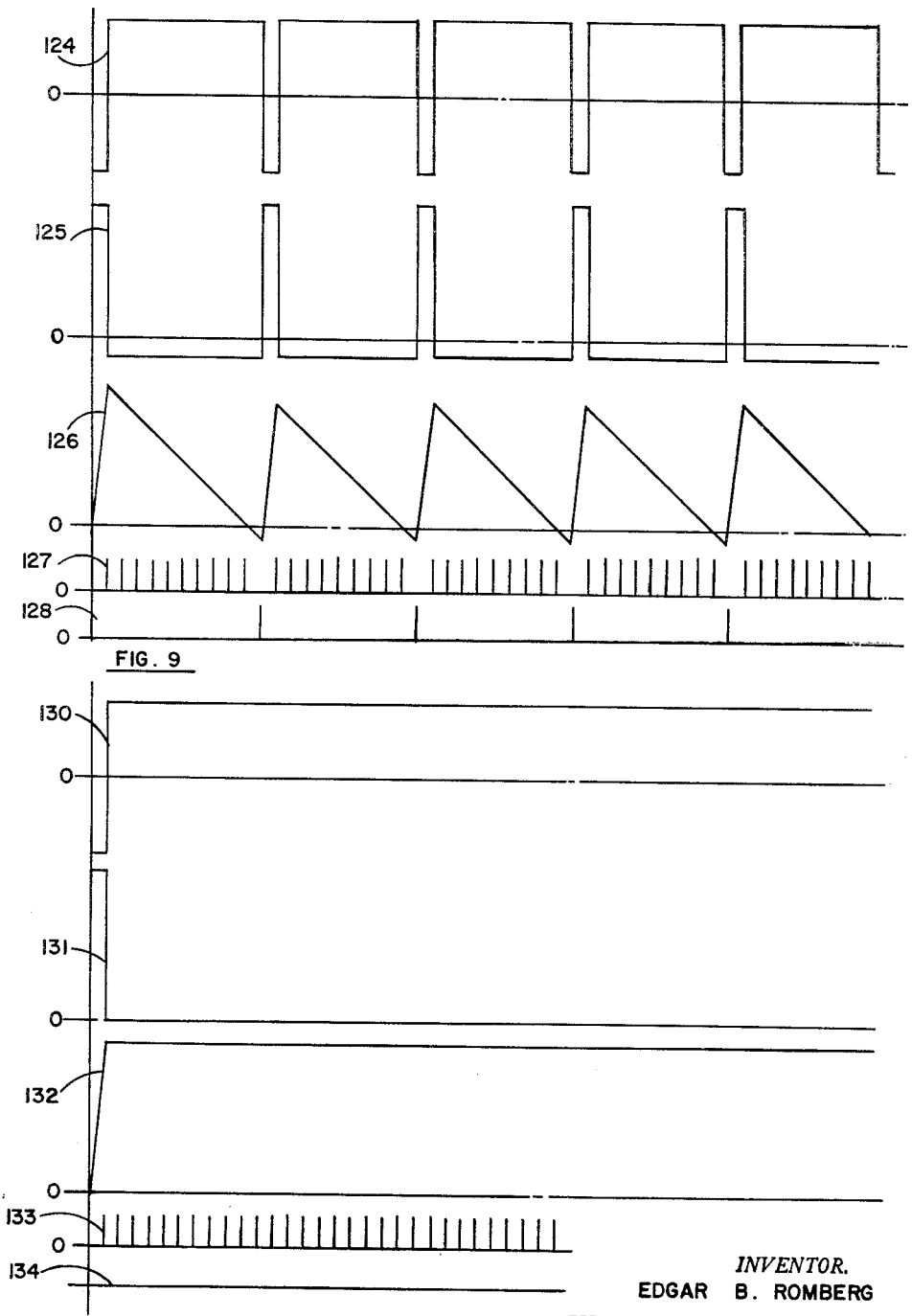

United States Patent Office 3,131,564
Patented May 5, 1964

3,131,564
VELOCITY METER WITH DIGITAL READOUT
Edgar B. Romberg, Whittier, Calif., assignor to
North American Aviation, Inc.
Filed Dec. 30, 1960, Ser. No. 79,924
17 Claims. (Cl. 73—503)

This invention pertains to a velocity meter, and more particularly to a velocity meter which is adapted to produce velocity information in digital form.

In a broader sense, the device of this invention is an analog to digital converter.

In modern vehicles such as missiles, submarines, and the like, there is a trend toward the use of digital computers. It is frequently necessary to supply to a digital computer a signal which is a measure of the velocity of the supporting vehicle. It is preferable that the velocity sensor generate a digital signal rather than an analog signal so that an additional analog to digital signal conversion is unnecessary.

With an accelerometer or velocity meter which utilizes an unbalanced beam or lever to sense acceleration, the restoring torque for the beam preferably should be a smooth restoring torque rather than a pulsed one. That is, when the acceleration sensitive member or beam is servoed to a predetermined neutral position, the restoring torque must be applied in a smooth or analog fashion to avoid oscillation or chattering of the mechanical member. Further, if only a pulsed torque is applied to restore the acceleration sensitive beam or lever to its neutral position, the mechanical sensing member may hang off of its neutral position a prohibitive distance which causes errors in the information produced by the sensing mechanism.

In one embodiment of the device contemplated by this invention a mechanical acceleration sensing member is smoothly torqued to its neutral position by an electromagnetic torquing means, the current which generates the torque is integrated with respect to time, and the integrated information is removed in digital form.

In another device contemplated by this invention, a force is applied to a rigid mechanical force-sensing member in response to a continuous, or analog electrical signal, the force-sensing member is smoothly restored to a neutral position by means of an electromagnetic torquing device, the current which generates the torque on the force-sensing member is integrated with respect to time, and the integrated information is removed in digital form.

More particularly, one device of this invention utilizes a rigid mechanical member, means for generating a signal which is a measure of the displacement of said mechanical member from a predetermined neutral position, and an electromagnetic torquer which utilizes at least two windings to generate an electromagnetic field which is adapted to interact with a fixed magnetic field. The current driven through the windings of the electromagnetic torquer is controlled to cause the net magnetomotive force generated by the windings to be a measure of the force applied to the rigid mechanical member. Although the net megnetomotive force of the electromagnetic windings is proportional to the force applied to the rigid mechanical member, the magnetomotive force of one of the windings is produced by a series of bidirectional current pulses fed thereto while the magnetomotive force of the other winding is produced by a series of similar but opposite phase bidirectional current pulses and a D.C. current proportional to the force applied to the rigid mechanical member: the pulsed component generates a magnetomotive force which opposes the first mentioned pulsed magnetomotive force. The current pulse through one of the windings is a precision current pulse, i.e., a pulse whose amplitude and time duration is precise. The current pulses in the first winding are servoed to cause the magnetomotive force generated by the other winding to just compensate and eliminate the magnetomotive force generated by the precision current pulses.

More narrowly, the force applied to the rigid mechanical member may be caused by a mass unbalance, or alternatively, it may be generated by a separate torquing coil whose force is a measure of an applied analog signal. In the alternative embodiment, the output of the device of this invention would be a digital measure of the input analog signal.

In one of the embodiments of this invention a rigid mechanical member is pivoted relative to its supporting vehicle. A pickoff device or deflection detecting device is utilized to detect displacement of the mechanical member from a predetermined neutral position and to generate an electrical signal which is a measure of said displacement. The electrical displacement signal is channeled through an amplifier in series with a capacitor to a first electromagnetic winding on a torquing means to generate a magnetic field which is adapted to cooperate with a stationary electromagnetic field to generate a restoring torque on the mechanical member. The voltage across the condenser or the charge on the condenser is a measure of the integral with respect to time of the current which has passed through the first winding. The voltage across the condenser controls the direction of current pulses from a current pulse generator which is adapted to generate current pulses of constant amplitude and time duration and to generate a series of pulses, spikes, or pips which are a measure of the direction of current of the current pulses. The current pulses of the pulse generator are channeled through a second winding on the torquing means. The direction of current flow through the second winding is controlled in response to the polarity of the voltage across the condenser. A resistance means is connected in series with the second winding to generate a voltage which is a measure of the amplitude and current direction through the second winding. The voltage from the series connected resistor is channeled to the input of the amplifier to cause current to flow through the condenser and the first winding in a direction to neutralize the magnetomotive force generated by the second winding and in a direction to discharge the capacitor. The charge upon the capacitor is a measure of the time-integral of the current in the first winding. With the force of the torquer just balancing the force applied to the mechanical member, and with the charge on the condenser continually tending toward zero, the charge or time-integral of current in the second winding is a measure of the integral of the force applied to the mechanical member. It is to be noted that the charge contribution of the second winding is applied in equal increments whereby the number of increments and their polarity is a digitized measure of the time-integral of force applied to the mechanical member.

The force applied to the mechanical member may be due to an acceleration acting upon an unbalanced mass. Alternatively, the force may be a measure of a continuous or analog signal. For example, a separate electromagnetic force generating means or torquing device may be utilized to apply a force to the mechanical member. If the force-applying-device is linear and if the current in the force-applying-device is a linear measure of an analog signal, the output of the device of this invention is a digitized measure of the integral of the analog signal.

It is therefore an object of this invention to measure the velocity of a supporting structure or vehicle and to present the velocity information in digitized form.

It is another object of this invention to generate a digital velocity information output signal.

It is likewise an object of this invention to utilize a modified analog accelerometer to generate a digitized signal which is a measure of velocity of a vehicle.

It is yet another object of this invention to convert an analog signal into a digital signal.

It is a more particular object of this invention to torque an eccentric mass accelerometer with a combination of simultaneous digital and analog signals, the sense of the digital signal being responsive to the sense of the integral of the analog signal and being a measure of the velocity of the supporting structure.

These and other objects of the invention will become apparent from the following description taken in connection with the accompanying drawings, in which FIG. 1 is a view, partially in profile and partially in section, of an eccentric mass, force-balanced accelerometer which uses a typical torquing means constructed in accordance with this invention;

FIG. 9 is a graph, plotted against time, with four-fifths of the maximum allowable input signal, of the current in the precision-pulsed coil, the current through the condenser and the coil connected thereto, the voltage across the condenser, and the timed output pulses of a typical device of this invention; and FIG. 10 is a graph, plotted against time, with the maximum allowable input signal, of the current in the precision-pulsed coil, the current through the condenser and the coil connected thereto, the voltage across the condenser, and the timed output pulses of a typical device of this invention.

Figure 1:
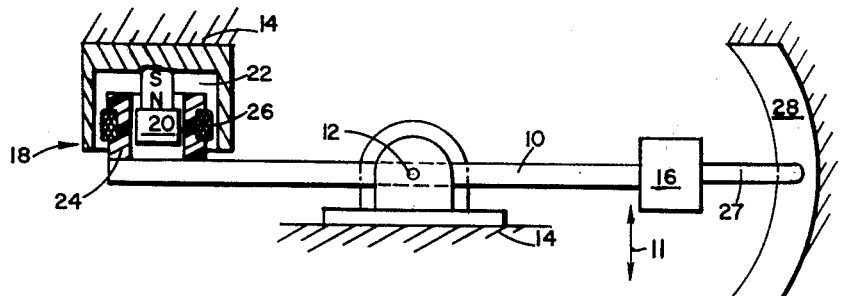

In FIG. 1, a force-balanced mechanical member 10 is pivoted about pivot 12 relative to a supporting vehicle or structure 14. Element 10 is a rigid member which may be unbalanced by mass 16 to be an acceleration sensitive member.

A force or torque is applied by torquing means 18 to acceleration sensitive member 10. A permanent magnet member 20, fabricated of ferromagnetic material, is fixed upon supporting vehicle 14. Permanent magnet member 20 forms an annular cavity 22 which is adapted to receive an annular coil support form 24 of non-ferromagnetic material. Coil form 24 is attached to be supported by mechanical member 10 and supports a pair of bifilar-wound electrical coils or windings which are shown generally at 26. Windings or electromagnetic means 26 are positioned in a region of substantially constant magnetic flux generated by permanent magnet 20. Interaction between the magnetic field produced by electromagnetic means 26 and permanent magnet means 20 produces a force or torque upon mechanical member 10. It is obvious that the positions of permanent magnet 20 and electromagnetic means 26 may be reversed, i.e., the permanent magnet may be attached to mechanical member 10 and the electromagnetic means 26 may be attached to the supporting vehicle 14.

A deflection sensing means or pickoff has a movable portion 27 attached to mechanical member 10 and a fixed portion 28. The shown deflection sensitive means 28 is a potentiometer. In alternative embodiments, the deflection sensing means could be—for example—an inductive or capacitive pickoff which is adapted to generate alternating signals which are a measure of the position of mechanical member 10 relative to its neutral position. Other deflection sensing means are known to the art. In the event that an alternating voltage pickoff or deflection sensing means is utilized, a demodulator and filter is needed to generate a direct voltage which is a measure of the deflection of mechanical member 10 from its neutral position.

The electrical output of the deflection sensing means 27 is connected at 27, through an appropriate impedance matching resistance 30 to an input of servo amplifier 32. The output of servo amplifier 32 is connected through condenser 34, winding 36 of electromagnetic means 26, and feedback resistor 38. A feedback current, in accordance with the useage in the design of feedback amplifiers, is connected through an impedance matching resistor 40 to a second input of servo amplifier 32.

The sense of the voltage between the output of amplifier 32 and a common connection 42 is utilized to control the direction of current pulses at output terminal 45 of current pulse generator 46. The current pulses at output terminal 45 of current pulse generator 46 have a first direction when the voltage at the output of amplifier 32 is positive with respect to common terminal 42 and have a second direction when the polarity of voltage at the output of amplifier 32 is negative with respect to common terminal 42. The current from terminal 45 is channeled through winding 44 of electromagnetic means 26 and through a resistor 47. The junction of winding 44 and resistor 47 is connected, through an impedance matching resistor 50 to the input of servo amplifier 32 to cause current pulses to flow through condenser 34 and through winding 36 of electromagnetic means 26.

Current pulse generator 46 generates timed pulses which are preferably spikes or pips at the beginning of each current pulse which appears at terminal 45. If the current at terminal 45 is in a first direction, a timing pulse appears between terminals 52 and 42, but if the current in terminal 45 is in a second direction, a timing pulse appears between terminals 54 and 42. The timing pulses at terminals 52 and 54 may be utilized by a digital computer as a measure of the integral of the input of the device of this invention.

Figure 3:
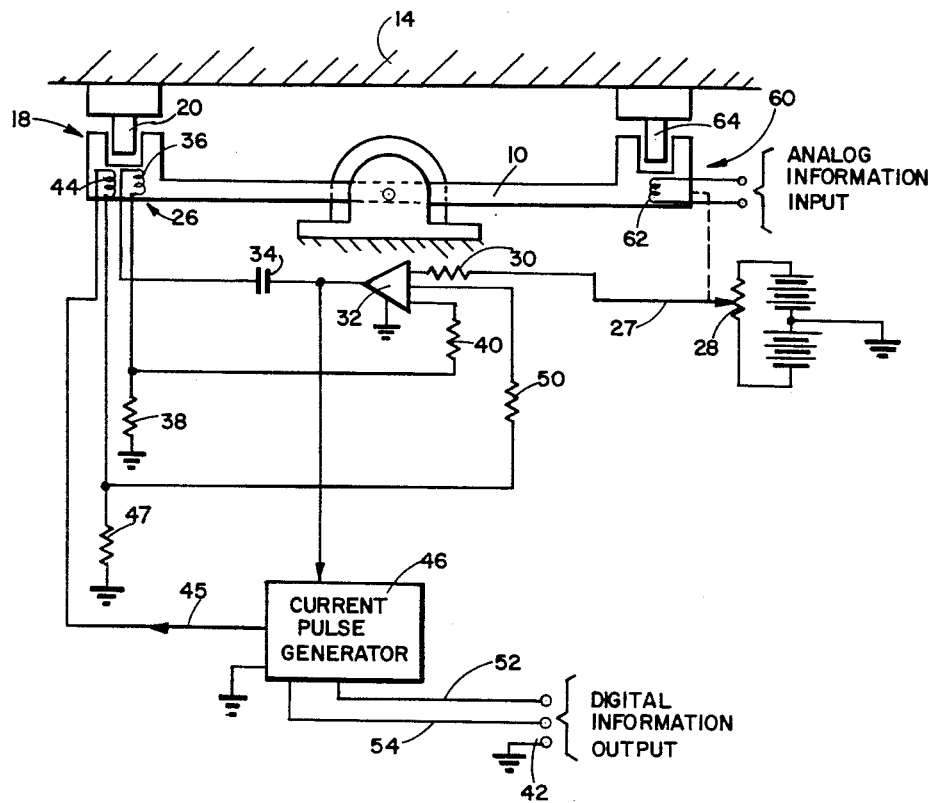
FIG. 3 is a diagram, partially schematic and partially in block form, of a second embodiment of this invention.

In FIG. 3 the eccentric mass 16 has been omitted. In its place an electromagnetic force-generating device 60 is connected to mechanical member 10 to apply to member 10 a force or torque which is linearly related to the analog input current through winding 62. A permanent magnet means 64 is attached to the supporting structure 14. It is to be stressed that the electromagnetic winding 62 and permanent magnet means 64 may be reversed in position with the permanent magnet means 64 attached to the mechanical member 10 and the electromagnetic winding 62 attached to the supporting structure 14. Further, the position of means 60 is not critical. Means 60 may, in fact, be combined with torquing means 18. The digital output appearing at terminals 52 and 54, then, is a measure of the integral of the input current to winding 62.

Figure 4:
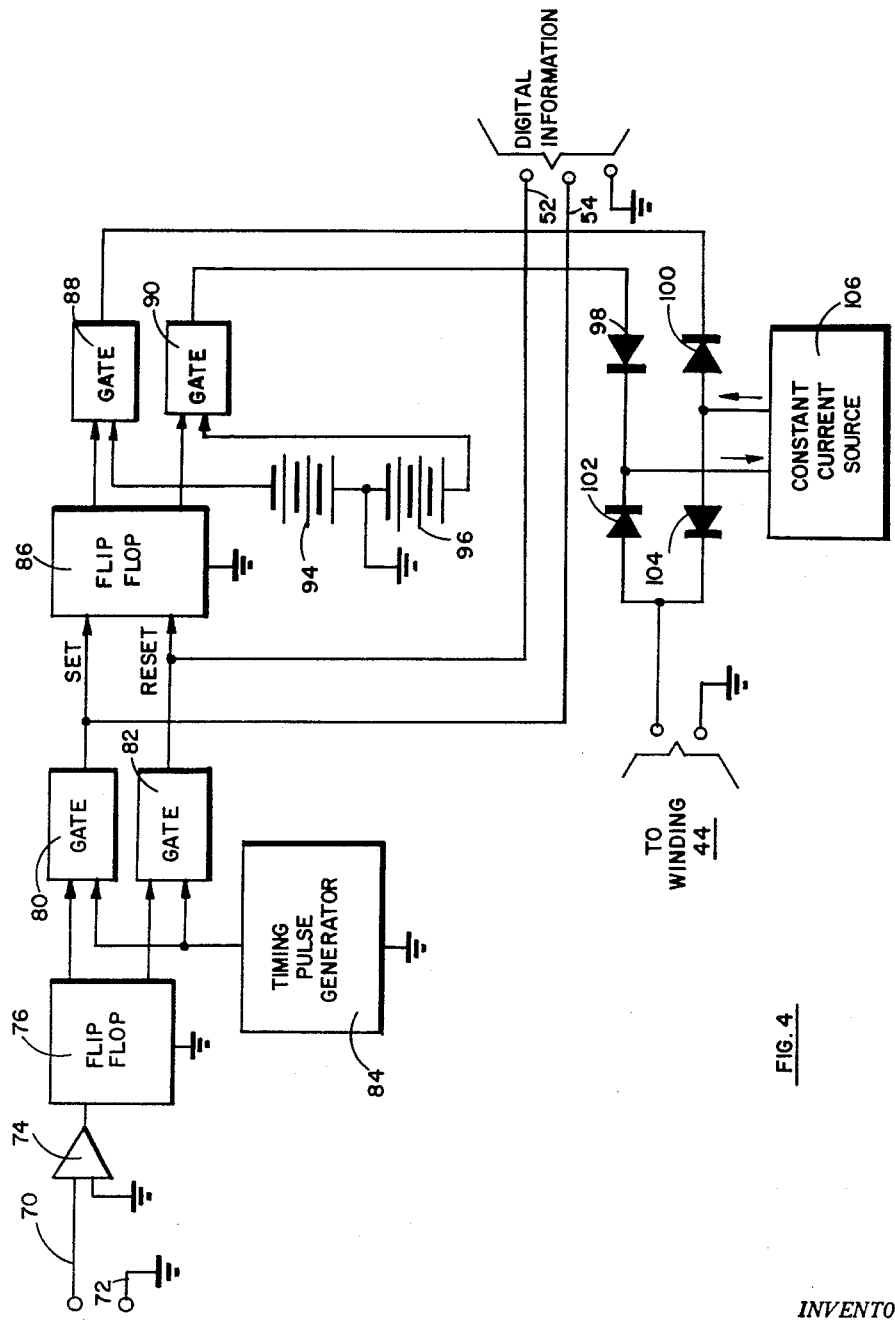
FIG. 4 is a diagram, partially schematic and partially in block form, of a current pulse generator which can be utilized in this invention.

A schematic and block diagram of a typical current pulse generator 46 is shown in FIG. 4. In FIG. 4, the input terminals 70 and 72 are the terminals which are connected across the condenser 34. Input terminals 70 and 72 are connected through isolating amplifier 74, to the input of flip flop circuit 76. The output of flip flop circuit 76 is connected to control gates 80 and 82. Timing pulse generator 84 is connected to be connected or disconnected by gates 80 and 82 to flip flop circuit 86. Timing pulse generator 84 is preferably adapted to generate spikes or pips with a predetermined timed spacing. Either gate 80 or gate 82 is opened to cause the timing pulses from pulse generator 84 to appear at the set or reset terminals, respectively, of flip flop circuit 86. The outputs of gates 80 and 82 appear, respectively, at the output terminals 52 and 54 of the current pulse generator. The outputs of gates 80 and 82 are connected to set or reset flip flop circuit 86. The output of flip flop circuit 86 is connected to the inputs of gates 88 and 90. Voltage sources 96 and 94 are connected to be channeled through gate 88 or gate 90, depending upon which of the gates is closed, to apply a particular potential to diodes 98 or 100, respectively. Diodes 98 and 100 are oppositely biased. Diode 102 is connected cathode-to-cathode to diode 98. Diode 104 is connected plate-to-plate to diode 100. Constant current source 106 has a current of predetermined amplitude and direction, connected between the junction of diodes 98 and 102 and the junction of diodes 100 and 104. The junction of diodes 102 and 104 is connected to winding 44.

In operation, the device of FIG. 1 is subjected to accelerations in the directions indicated by the acceleration arrows 11. Acceleration of the device deflects mechanical member 10 about pivot 12 relative to the supporting vehicle or platform 14. Magnetomotive force generated by the flow of current through electromagnetic means 26 interacts with the magnetic field of permanent magnet 20 to apply a restoring torque to mechanical member 10.

Figure 2:
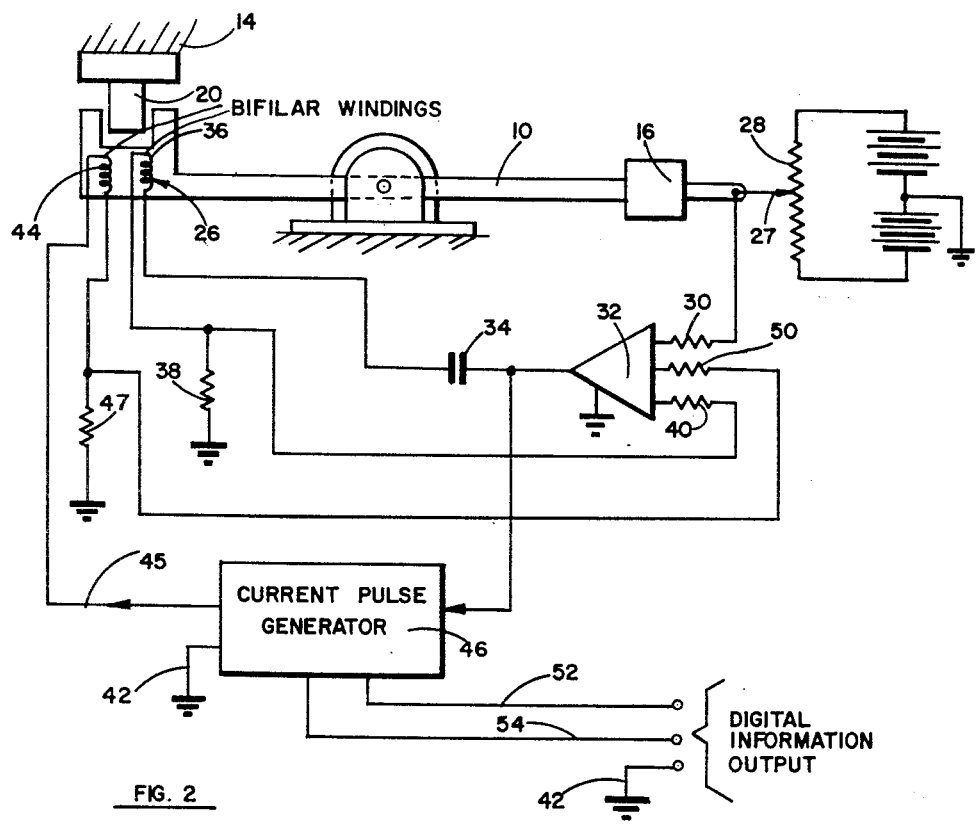
FIG. 2 is a diagram, partially schematic and partially in block form, of a first embodiment of this invention.

Referring to FIG. 2, a force, due to acceleration of mass 16, is applied to mechanical member 10. Rigid mechanical element 10 tends to deflect. Deflection of element 10 generates a potential on moveable arm 27 of potentiometer 28. The potential on arm 28 causes amplifier 32 to generate a current through capacitor 34, winding 36, and resistor 38 to generate a magnetomotive force at winding 36. Magnetomotive force at winding 36 generates a magnetic field which reacts with the magnetic field of permanent magnet 20 to apply a torque to rigid mechanical member 10. Current flow through capacitor 34 generates a voltage across capacitor 34. The polarity of the voltage across capacitor 34 controls current pulse generator 46 to drive current pulses of predetermined charge content and direction through winding 44 of electromagnetic element 26. The voltage appearing across resistor 47 is applied to amplifier 32 to generate a pulsed current, which is in a direction to discharge condenser 34, in winding 36. The pulsed component of current in winding 36 has an amplitude and direction to generate a magnetomotive force just to cancel the magnetomotive force generated by winding 44.

The restoring force $F_{18}$ applied by torquing means 18 is servoed to be linearly proportional to the acceleration ($a$) applied to sensing mass 16 or to the force $F_{60}$ applied by force generating means 60 of FIG. 3.

$$F_{18}=K_1 a$$

or $$F_{18}=K_2 F_{60}$$

where $K_1$, $K_2$ are constants of proportion.

The force $F_{18}$ applied by torquer 18 is also linearly proportional to the net magnetomotive force $F_{26}$ generated by electromagnetic means 26, i.e., by windings 44 and 36. The magnetomotive force $F_{26}$ generated by electromagnetic means 26 is a linear function of the currents ($i_{36}$ and $i_{44}$), with due regard to current direction, flowing within windings 36 and 44.

$$F_{18}=K_3 F_{26}$$
$$F_{26}=K_4 i_{36}+K_5 i_{44}$$

where $K_3$, $K_4$, $K_5$ are constants of proportion.

The velocity ($v$) of the supporting vehicle or the integral with respect to time of the force $F_{60}$ applied by forcing means 60 is then proportional to the integral with respect to time, of a linear function of the current $i_{36}$ in winding 36 and the current $i_{44}$ in winding 44.

$$v=\int_0^t a\,dt$$

$$a=K_6 F_{18}$$

$$v=K_6 \int_0^t F_{18}\,dt$$

$$v=K_7 \int_0^t F_{26}\,dt$$

where $K_6$ and $K_7$ are constants of proportion.

The linear function may be broken into two integrals so that the velocity of the supporting structure or the integral of the force applied by forcing means 60 then is a linear function of two integrals, i.e., the integral of the current in winding 36 and the integral of the current in winding 44.

$$v=K_8 \int_0^t i_{36}\,dt$$
$$+K_9 \int_0^t i_{44}\,dt$$

where $K_8$ and $K_9$ are constants of proportion.

The integral of the current in winding 36 is proportional to the charge ($v_{34}$) on condenser 34. By servoing the charge ($q_{34}$) on condenser 34 continually toward zero, the velocity ($v$) or the integral of the force ($F_{60}$) generated by forcing means 60 is almost (within the limit of allowable error) linearly proportional to the integral of the current in winding 44 alone.

$$v \approx K_8 \int_0^t i_{36}\,dt$$
$$+0$$
$$v \approx K_8 \int_0^t i_{36}\,dt$$
$$=K_8 \sum_{K=1}^n i_{36_K} \Delta t$$
$$=K_8 \Delta t \sum_{K=1}^n i_{36_K}$$

where $\Delta t$ is the time width of each pulse and $i_{36_K}$ carries an algebraic sign. Since the amplitude and time duration of each current pulse from current pulse generator 46 to winding 44 is known, by merely counting the pulses the integral of the current is obtained in digital form. Each current pulse in a predetermined direction from terminal 45 appears simultaneously with a spike or pip on terminals 52 or 54. When the current flows in one direction at terminal 45 the timed pips appear at terminal 52. When the current reverses at terminal 45 the timed pips appear at terminal 54.

The direction of current flow at terminal 45 is controlled in response to the polarity of the voltage at the output of amplifier 32, hence in response to the voltage across condenser 34. The current pulses flowing through resistor 47 generate a signal at resistor 50 which causes current to flow through condenser 34, winding 36 and resistor 38 in a pulse form just sufficient in amplitude to counter the magnetomotive force generated by winding 44 and in a direction to reduce the voltage across condenser 34.

In operation of the current pulse generator of FIG. 4, voltage which appears between terminals 70 and 72 is amplified by isolation amplifier 74 and applied to control flip flop circuit 76. The output voltage of flip flop circuit 76 is either positive or negative with respect to the common terminal 72. When the voltage applied to the input of flip flop circuit 76 is positive, the output voltage of flip-flop 76—for example—becomes positive with respect to terminal 72. When the voltage applied to the input of flip flop circuit 76 is negative with respect to terminal 72, the output voltage of flip flop 76 becomes negative with respect to the terminal 72. When the voltage applied to the input of flip flop 76 is zero, the output voltage of flip flop circuit 76 remains at the voltage which it held immediately prior to the zero voltage.

Timing pulse generator 84 is adapted to generate equally-time-spaced spikes or pips. When the voltage at the output of flip flop 76 is positive, gate 80 opens to allow the timing pulses from timing pulse generator 84 to appear at the set terminal of flip flop 86. When the voltage at the output of flip flop circuit 76 is negative, gate 82 is opened to allow timing pulses to appear at the reset terminal of flip flop 86. Timing pulses which appear at the set terminal of flip flop circuit 86 also appear at terminal 54 and timing pulses that appear at the reset terminal of flip flop circuit 86 appear at terminal 52.

When a timing pulse appears at the set terminal of flip flop circuit 86, flip flop circuit 86 generates a positive output voltage. If the output voltage of flip flop circuit 86 is positive, additional timing pulses appearing at the set terminal do not cause the output voltage polarity to change. When a timing pulse appears at the reset terminal of flip flop circuit 86, the output voltage of circuit 86 becomes negative. Simultaneous signals at both the set and reset terminals of flip flop 86 is precluded by flip flop circuit 76 and gates 80, 82.

A positive voltage at the output of flip flop circuit 86 opens gate 88 to apply a voltage to diode 100. A negative voltage at the output of flip flop 86 opens gate 90 to apply a voltage to diode 98.

With the gate 88 open, a negative voltage is applied to diode 100. Current continually flows from constant current source 106 in the direction indicated by the arrows adjacent block 106. Thus, when gate 88 is open, current flows through diode 100, through voltage source 94 to the ground terminal 72, thence through winding 44 and diode 102 back to the constant current source 106.

When gate 90 is opened, a positive voltage is applied to diode 98. Current flows from constant current source 106, through diode 104, through windings 44 to the ground terminal 72, thence through voltage source 96 and diode 98 to constant current source 106.

As long as the voltage between terminals 70 and 72 is positive, amplifier 74 causes a positive voltage to appear at the output of flip-flop 76 which causes gate 80 to remain open to allow timing pulses to appear at terminal 54 and to set flip flop circuit 86 to cause a positive voltage at the output thereof. Positive voltage at the output of flip-flop 86 causes gate 88 to open to cause current to flow in one direction through winding 44. When the voltage between terminals 70 and 72 is negative, the voltage at the input to flip flop circuit 76 is negative which causes a negative voltage to appear at the output thereof to open gate 82 to allow timing pulses to appear at the reset terminal of flip flop circuit 86 and at terminal 52. Timing pulses at the reset terminal of flip flop circuit 86 cause a negative voltage at the output of flip flop circuit 86 which opens gate 90 to cause the current to flow in a second direction, through winding 44.

Reference is now made to FIGS. 6 through 11 which are presented to demonstrate the operation of a typical device of this invention utilized as an accelerometer. In each of FIGS. 6 through 11 a graph of the current through each of the windings 36 and 44, a graph of the voltage at the output of amplifier 32, and graphs of the timing pulses appearing at terminals 52 and 54 is presented for different constant acceleration values.

Each of the Figs. 6 through 11—for example—utilizes a pulse rate of 320 timing pulses per second, displaced along the horizontal axis. The scale factor is adjusted so that the area under the current in winding 44 curves between two consecutive clock pulses which corresponds to a velocity of one foot per second.

The scale of the ordinate on the voltage curve at the output of amplifier 32 is one foot per second for five-eighths of an inch. The ordinate scale on the timed pulses is not significant since the number of pulses is the only important matter. Pulses which are above the reference line indicate positive acceleration or velocity while pulses below the reference line indicate negative acceleration or velocity.

The positive acceleration pulses appear on terminal 52 while the negative pulses appear on terminal 54.

Figure 5:
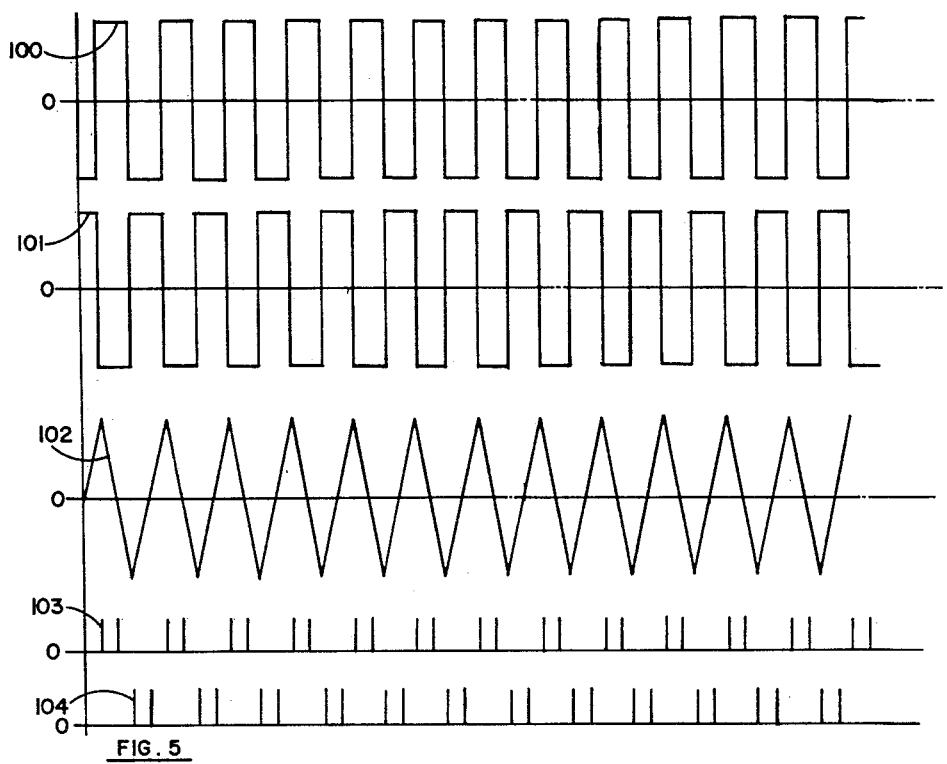
FIG. 5 is a graph, plotted against time, with no applied input signal, of the current through the precision-pulsed coil, the current through the condenser, and the coil connected thereto, the voltage across the condenser, and the timed output pulses of a typical device of this invention.

In FIG. 5 the applied acceleration is zero. The square wave plot 100 is the current through winding 44. The square wave plot 101 is the current through winding 36. The triangular waveform 102 is a graph of the voltage at the output of amplifier 32. The small vertical lines of graphs 103 and 104 are the pulses which appear at terminals 52 and 54, respectively. It is to be noted that, over a timed average, the number of pulses at terminal 52 equals the number of pulses at terminal 54, which signifies in digital form the applied acceleration is equal to zero and that the velocity is zero.

Figure 6:
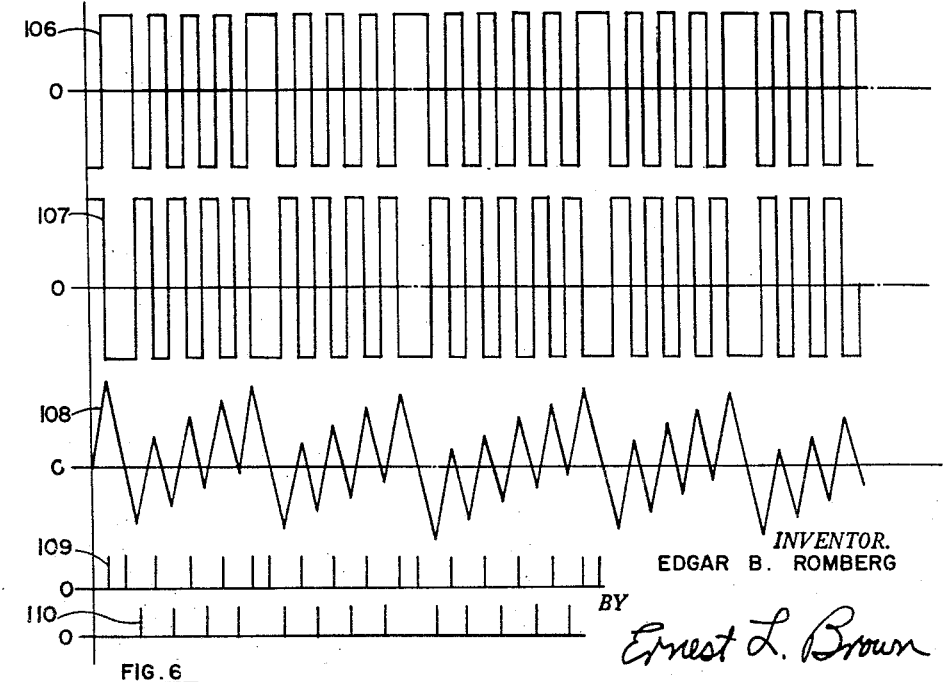
FIG. 6 is a graph, plotted against time, with one-tenth of the maximum allowable input signal, of the current in the precision-pulsed coil, the current through the condenser and the coil connected thereto, the voltage across the condenser, and the timed output pulses of a typical device of this invention.

FIG. 6 is a graph of the waveforms obtained when the applied acceleration is 32 ft. per second squared, or one-tenth of the upper limit of acceleration readable by the instrument. The square wave plot 106 is a graph of the current through coil 44. The square wave plot 107 is a graph of the current through coil 36. The saw-toothed waveform 108 is a graph of the voltage at the output of amplifier 32. The graphs 109 and 110 of short vertical lines are graphs of the pulses appearing at terminals 52 and 54, respectively. It is to be noted that, with the exception of the small error introduced at the beginning of the plot, over a period of one second there are 32 more positive pulses than there are negative pulses, which signifies in digital form that the net velocity, measured by the net number of pulses at terminal 52 minus the pulses at terminal 54, is 32 feet per second at the end of one second.

Figure 7:
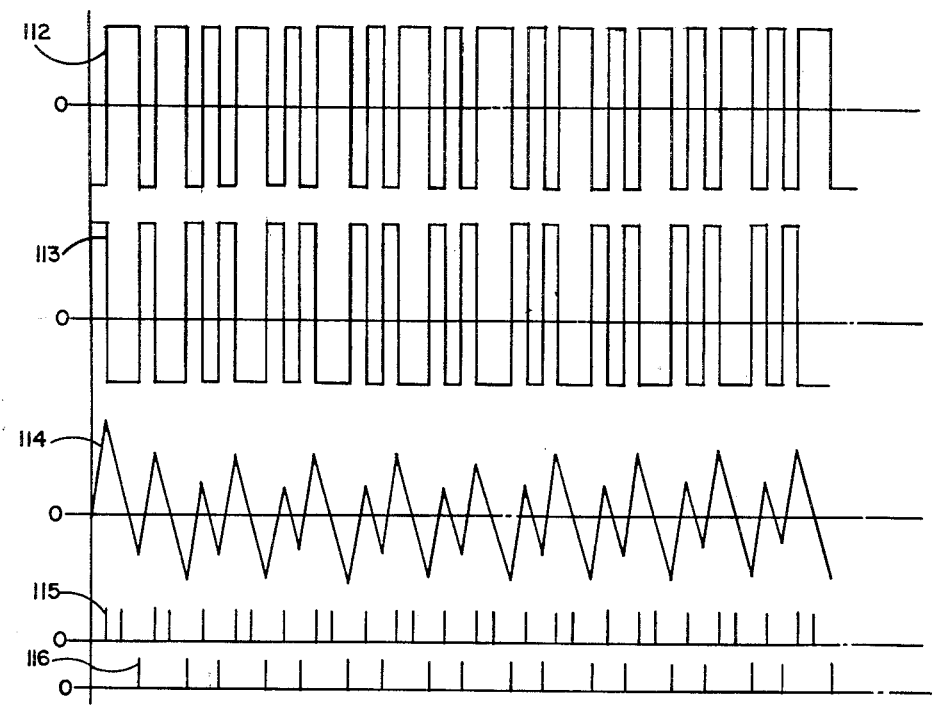
FIG. 7 is a graph, plotted against time, with one-fifth of the maximum allowable input signal, of the current in the precision-pulsed coil, the current through the condenser and the coil connected thereto, the voltage across the condenser, and the timed output pulses of a typical device of this invention.

In FIG. 7 the applied acceleration is 64 feet per second squared or one-fifth of the upper limit of acceleration measurable by the accelerometer of this example. The square wave signal 112 is a graph of the current through coil 44. The square wave signal 113 is a graph of the current through coil 36. The triangular waveform 114 is a graph of the voltage at the output of amplifier 32. The short vertical lines 115 and 116 are timing pulses appearing at terminals 52 and 54, respectively. It is to be noted that over a period of 320 timing pulses, or one second, that (with the exception of the error introduced at the beginning of the plot) the number of pulses at terminal 52 exceeds the number of pulses at terminal 54 by a total of 64 which signifies in digital form that the velocity after one second is 64 feet per second.

Figure 8:
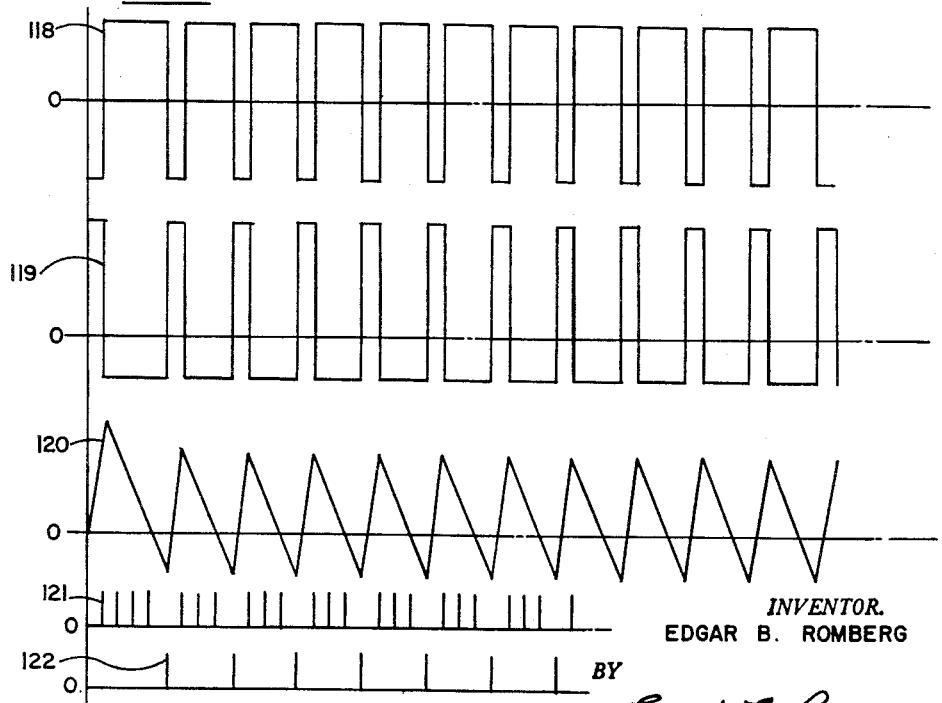
FIG. 8 is a graph, plotted against time with one-half of the maximum allowable input signal, of the current in the precision-pulsed coil, the current through the condenser and the coil connected thereto, the voltage across the condenser, and the timed output pulses of a typical device of this invention.

In FIG. 8 the applied acceleration is 160 feet per second squared or one half of the upper limit of measurement by the accelerometer. The square wave plot 118 is a graph of the current through coil 44. The square wave plot 119 is a graph of the current in winding 36. The triangular waveform 120 is a graph of the voltage appearing at the output of amplifier 32. The short vertical lines of graphs 121 and 122 indicate the timing pulses which appear at terminals 52 and 54, respectively. It is to be noted that over a period represented by 320 timing pulses, or one second, that the number of pulses at terminal 52 (with the exception of the error introduced at the beginning of the plot) exceed the number of pulses at terminal 54 by 160, which signifies in digital form that the velocity after one second is 160 feet per second.

In FIG. 9 the applied acceleration is 256 feet per second squared or four-fifths of the upper limit of the range of the accelerometer. The square wave plot 124 is a graph of the current through winding 44. The square wave plot 125 is a graph of the current in winding 36. The triangular waveform 126 is a graph of the voltage at the output of amplifier 32. The short vertical lines of graphs 127 and 128 are the timing pulses which appear at terminals 52 and 54, respectively. It is to be noted that over a period of 360 timing pulses, or one second, that the number of pulses at terminal 52 exceeds the number of pulses at terminal 54 by 256 which signifies in digital form that the velocity at the end of one second is 256 feet per second.

In FIG. 10 the applied acceleration is 320 feet per second squared, or the upper limit of acceleration for the example chosen. The graph 130, with the step function at its leading edge, is a graph of the current through winding 44. The graph 131, with a step function at its leading edge, is a graph of the current through winding 36. The flat topped curve 132, with a ramp function at its leading edge, is a graph of the voltage at the output of amplifier 32. The short vertical lines of graph 133 and the absence of short vertical lines of graph 134 are the timing pulses appearing at terminals 52 and 54, respectively. It is to be noted that with this applied acceleration, no timing pulses appear at terminal 54. Over a period of 360 timing pulses, or one second, the number of timing pulses at terminal 52 exceeds the number of pulses at terminal 54 by 360 pulses, which signifies in digital form that the velocity after one second is 320 feet per second.

Thus, the device of this invention is a force-balance accelerometer in which the mechanical element has only analog or smooth restoring torque applied thereto to cause the sensing element to be more sensitive to acceleration. The device of this invention, further, generates a digital output which is a measure of the velocity generated by the applied acceleration.

The device of this invention is also an analog to digital transducer, and more particularly a device which is adapted to receive an analog signal and to produce a digital signal which is a measure of the timed integral of the received analog signal.

Although the device of this invention has been described particularly in connection with the above description and the accompanying drawings it is not intended that the invention should be limited thereby but only in accordance and scope of the following claims, in which I claim:

1. In combination: a pivotal element; means for detecting the deflection of said element; magnetic force generating means, including at least two electromagnet means and a further magnet means disposed to apply force to said pivotal element; capacitive means connected to provide electrical signals to at least one of said electromagnet means; pulse generating means connected to be controlled by an electrical signal from said capacitive means, said pulse generating means connected to provide pulse signals to said second electromagnet means; amplifying means connected to receive the output of said detecting means and at least a portion of the pulse signals transmitted to said second electromagnet means, said amplifying means connected to provide an electrical signal to said capacitive means with a sense to decrease said signal controlling said pulse generating means; whereby said pulses form a digital output which is a measure of the time integral of force applied to said pivotal member.

2. In combination: a mechanical member, pivoted for rotation; detecting means for detecting the deflection of said mechanical member from a predetermined neutral position and for generating a signal which is a measure of said deflection; magnetic force generating means, connected to apply force to said mechanical member, including at least two electromagnet means and an additional magnet means; capacitive means connected in series with a first one of said electromagnet means; pulse generating means, adapted to generate current pulses of equal charge content with a direction controlled by the polarity of voltage across said capacitive means, and adapted to generate digital information pulses in response to the polarity of said capacitive voltage, the current pulses being driven through the second said electromagnet means; amplifying means, connected to charge and discharge said capacitive means and to drive current through said first electromagnet means in response both to the signal from said detection means and the current pulses through said second electromagnet means to cause said mechanical member to receive a smooth restoring torque and to cause said digital information pulses to be a measure of the time integral of force applied to said mechanical member.

3. A device as recited in claim 2 and further comprising a mass positioned upon said mechanical member to be responsive to acceleration in a predetermined direction, said force to be integrated arising from acceleration action upon said mass.

4. A device as recited in claim 2 and further comprising third electromagnet means adapted to apply force to said mechanical member, said force to be integrated being applied by said third electromagnetic means to cause said digital information pulses to be a measure of the integral of the current applied to said third electromagnetic means.

5. In combination: a mechanical member, pivoted for rotation; detecting means for detecting the deflection of said mechanical member from a predetermined neutral position and for generating a signal which is a measure of said deflection; magnetic force generating means, connected to apply force to said mechanical member, including two electromagnet means and an additional magnet means; capacitive means, connected in series with a first one of said electromagnet means; pulse generating means adapted to generate current pulses of equal charge content having a direction controlled by the polarity of voltage across said capacitive means, and adapted to generate digital information pulses at two separate terminals in response to the polarity of said capacitive voltage, digital information pulses appearing on a first said terminal when the voltage across said capacitive means has a first polarity and digital information pulses appearing on a second said terminal when the voltage across said capacitive means has a second polarity, the current pulses being driven through the second said electromagnet means; amplifying means connected to charge and discharge said capacitive means and to drive current through said first electromagnet means in response both to signals from said detection means and to the current pulses through said second electromagnet means to cause said mechanical member to receive a smooth restoring torque and to cause the difference between said digital information pulses appearing at said two terminals to be a measure of the timed integral of force applied to said mechanical member.

6. A device as recited in claim 5 and further comprising a mass positioned upon said mechanical member to be responsive to acceleration in a predetermined direction, said force to be integrated arising from acceleration action upon said mass.

7. A device as recited in claim 5 and further comprising third electromagnet means adapted to apply force to said mechanical member, said forces to be integrated being applied by said third electromagnetic means to cause said digital information pulses to be a measure of the integral of the current applied to said third electromagnetic means.

8. In combination: a mechanical member, pivoted for rotation; detecting means for detecting the deflection of said mechanical member from a predetermined position and for generating a signal which is a measure of said deflection; magnetic force generating means, connected to apply force to said mechanical member, including a pair of wound electrical coils in which magnetomotive force generated by opposing pulsed currents in said coils tend to cancel and including a permanent magnet adapted to generate a magnetic field to cooperate with the magnetic field of said coils to apply force to said mechanical member; capacitive means, connected in series with the first one of said coils; pulse generating means, adapted to generate current pulses of equal charge content and of direction controlled by the polarity of voltage across said capacitive means, and adapted to generate digital information pulses in response to the polarity of said capacitive voltage, the current pulses being driven through the second of said coils; amplifying means, connected to charge and discharge said capacitive means and to drive current through said first coil in response both to signals from said detection means and to the current pulses through said second coil to cause said mechanical member to receive a smooth restoring torque and to cause said digital information pulses to be a measure of the time integral of force applied to said mechanical member.

9. A device as recited in claim 8 and further comprising a mass positioned upon said mechanical member to be responsive to acceleration in a predetermined direction, the force to be integrated being force applied by said mass to said mechanical member in response to said acceleration.

10. A device as recited in claim 8 and further comprising electromagnetic means and a permanent magnet adapted to cooperate to apply force to said mechanical member and including at least a single current winding, said force to be integrated being generated by said electromagnetic means and being linearly proportional to current applied to said last named winding.

11. In combination: a supporting structure; a mechanical member, pivoted about a predetermined axis relative to said supporting structure; pickoff means, adapted to generate an electrical signal which is a measure of deflection of said mechanical member from a predetermined position; force means, attached to said mechanical member and adapted to generate a force by magnetic interaction between two magnetic means, one said magnetic means being first and second electromagnetic windings, one said magnetic means being attached to said mechanical means and the other said magnetic means being attached to said supporting structure; an electrical condenser connected in series with the first said winding; a current pulse generator adapted to generate current pulses whose direction is responsive to the polarity of voltage across said condenser and whose charge content is equal, the current pulses from said current pulse generator being connected in series with said second winding; said current pulse generator being adapted to generate timed pulses which have characteristics responsive to the polarity of voltage across said condenser; a servo amplifier, connected to drive current through said first winding and through said condenser in response to signals from said pickoff means; means for feeding back a signal which is a measure of the current in said second winding to a second input of said amplifier to modify the current flow through said first winding and said condenser to cause the magnetomotive force generated by said first winding in response to the current fed to said amplifier from said second winding to cancel the magnetomotive force generated by said second winding, the magnetomotive force generated in said first winding in response to signals from said pickoff means causing said mechanical means to be servoed smoothly into said predetermined position.

12. A device as recited in claim 11 in which said two windings are bifilar windings.

13. A device as recited in claim 11 in which said mechanical member has a mass unbalance on one side of said pivot to cause said member to tend to be deflected in response to acceleration in a predetermined direction normal to the axis of said pivot.

14. A force balance accelerometer having a smooth restoring torque and a digital output comprising: a mechanical member, pivoted about a predetermined axis; a pickoff device adapted to generate a signal which is a measure of the deflection about said pivot from a predetermined position of said mechanical member; a servo amplifier connected to receive an input from said pickoff device, an electrical condenser connected by one terminal to the output of said servo amplifier; a first and second electrical winding wound to form an electromagnet, an additional magnet adapted to generate a magnetic field to cooperate with magnetic fields generated by current flow through said windings, said magnets being positioned to apply a torque about said pivot to said mechanical member on one side of said predetermined pivot axis, the first said winding being connected between the second terminal of said condenser and the output of said amplifier to form a closed current path; a constant current source; means for generating timed electrical pulses having a characteristic responsive to the polarity of voltage across said condenser; means for controllably channeling current from said constant current source through said second winding in response to the polarity of voltage across said condenser and in response to said timing pulses; and means for feeding back a signal from said second winding to the input of servo amplifier to cause current pulses to be driven through said condenser and said first winding in a direction to counter the magnetomotive force generated by said second winding and in a direction to discharge said condenser.

15. A device as recited in claim 14 and further comprising means for applying force to said mechanical member on the side of said pivot axis opposite said one side thereof.

16. A device as recited in claim 15 in which said means for applying force is a mass positioned upon said mechanical member to be sensitive to acceleration in a direction normal to the axis of said pivot.

17. A device as recited in claim 15 in which said means for generating force is a second electromagnetic means including a third winding and a permanent magnet to cause said force to be a function of the current within said third winding.

No references cited.